United States Patent
Hu et al.

(10) Patent No.: US 11,392,276 B2
(45) Date of Patent: Jul. 19, 2022

(54) METHOD AND APPARATUS FOR USER-DESIGNATED APPLICATION PRIORITIZATION

(71) Applicant: FORD GLOBAL TECHNOLOGIES, LLC, Dearborn, MI (US)

(72) Inventors: Jeffrey Yizhou Hu, Ann Arbor, MI (US); Michael Crimando, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 570 days.

(21) Appl. No.: 15/619,047

(22) Filed: Jun. 9, 2017

(65) Prior Publication Data
US 2018/0357071 A1 Dec. 13, 2018

(51) Int. Cl.
G06F 9/451 (2018.01)
G06F 3/04817 (2022.01)
G06F 3/0483 (2013.01)
G06F 9/445 (2018.01)

(52) U.S. Cl.
CPC ............ *G06F 3/0483* (2013.01); *G06F 9/445* (2013.01); *G06F 9/451* (2018.02); *G06F 3/04817* (2013.01)

(58) Field of Classification Search
CPC .... G06F 9/451; G06F 3/04817; G06F 3/0482; G06F 3/0483; G06F 3/0484; G06F 9/445; G06F 9/4881; B60K 2350/962; B60K 2350/965; B60K 2350/967; B60K 2350/906; B60K 2350/908; B60K 2350/352
See application file for complete search history.

(56) References Cited

U.S. PATENT DOCUMENTS

| | | | |
|---|---|---|---|
| 8,229,495 B1* | 7/2012 | Wolter | H04M 1/72586 455/503 |
| 8,464,180 B1* | 6/2013 | Kirkham | H04M 1/72586 715/765 |
| 9,128,757 B2 | 9/2015 | Wang | |
| 9,268,481 B2 | 2/2016 | Nemoto | |
| 9,514,406 B2 | 12/2016 | Boyer | |
| 2011/0055741 A1* | 3/2011 | Jeon | G06F 3/04817 715/765 |
| 2011/0115880 A1* | 5/2011 | Yoo | H04N 13/156 348/42 |
| 2011/0319130 A1* | 12/2011 | Lee | H04M 1/72572 455/556.1 |

(Continued)

OTHER PUBLICATIONS https://www.merriam-webster.com/dictionary/denotation (accessed Feb. 15, 2022); Merriam Webster's Seventh New Collegiate Dictionary 221 (1961) (defining "denotation" as "a direct specific meaning as distinct from connotations").*

*Primary Examiner* — Kieu D Vu
*Assistant Examiner* — Rami R Okasha
(74) *Attorney, Agent, or Firm* — Michael Spenner; Brooks Kushman P.C.

(57) ABSTRACT

A computer-implemented method includes restricting an accessible number of applications while an application-limiting state exists in a vehicle. In this embodiment, the restricting including re-ordering displayed application icons such that applications having a user-designated priority associated therewith are still accessible on a vehicle display being limited by the restricting.

16 Claims, 3 Drawing Sheets

(56) References Cited

U.S. PATENT DOCUMENTS

| | | | | |
|---|---|---|---|---|
| 2012/0143391 A1* | 6/2012 | Gee | G06F 3/04817 | 715/765 |
| 2012/0262403 A1* | 10/2012 | Tissot | B60K 35/00 | 345/173 |
| 2012/0272154 A1* | 10/2012 | Ichihara | B60W 50/14 | 715/738 |
| 2013/0007662 A1* | 1/2013 | Bank | G06F 9/451 | 715/811 |
| 2013/0166146 A1* | 6/2013 | Tanaka | G06F 3/0488 | 701/36 |
| 2014/0283141 A1* | 9/2014 | Shepherd | G06F 3/0482 | 726/30 |
| 2015/0156307 A1* | 6/2015 | Kim | H04W 52/0261 | 455/566 |
| 2015/0234665 A1* | 8/2015 | Matsuyuki | G08G 1/0962 | 701/36 |
| 2015/0278502 A1* | 10/2015 | Broms | G06F 21/36 | 707/783 |
| 2015/0339031 A1* | 11/2015 | Zeinstra | B60K 37/06 | 715/747 |
| 2016/0018941 A1* | 1/2016 | Kim | G06F 9/44505 | 345/173 |
| 2016/0154561 A1* | 6/2016 | Kato | G01C 21/3664 | 345/173 |
| 2017/0052666 A1* | 2/2017 | Wang | B60K 35/00 | |
| 2018/0093611 A1* | 4/2018 | Kim | B60Q 9/00 | |
| 2018/0188901 A1* | 7/2018 | Shtuchkin | G06F 3/0482 | |
| 2018/0196589 A1* | 7/2018 | Feit | G06F 3/04847 | |
| 2018/0217717 A1* | 8/2018 | Yasuda | G06F 3/04817 | |

* cited by examiner

METHOD AND APPARATUS FOR USER-DESIGNATED APPLICATION PRIORITIZATION

TECHNICAL FIELD

The illustrative embodiments generally relate to methods and apparatuses for user-designated application prioritization.

BACKGROUND

Vehicle technology is advancing at an accelerated rate, providing connectivity options and application utilization capabilities within a vehicle experience. Similar to a display on a tablet or smart phone, drivers and occupants can view and access lists of applications installed in a vehicle, or available to a vehicle through a connection with a server or a smart-phone or other portable device. And, just as a display on a tablet or smart-phone, addition of numerous applications can result in pages and pages of displayed application options.

While multiple screens of applications may not present a particular problem on a smart-phone, in a vehicle environment it can be difficult for a driver to parse numerous pages of applications, especially while a vehicle is in motion. While many applications have driving-related utility, the public has a vested interest in drivers not scrolling through page after page of applications while the driver should be focused on the road.

SUMMARY

In a first illustrative embodiment, a computer-implemented method includes restricting an accessible number of applications while an application-limiting state exists in a vehicle. In this embodiment, the restricting including re-ordering displayed application icons such that applications having a user-designated priority associated therewith are still accessible on a vehicle display being limited by the restricting.

In a second illustrative embodiment, a system includes a processor configured to receive a priority designation for an application accessible through a vehicle display. The processor is also configured to determine when an application-limiting state exists within a vehicle. The processor is further configured to re-order application icons such that the application having the priority designation is still accessible on a restricted display of application icons and present the restricted display on the vehicle display, including the application having the priority designation.

In a third illustrative embodiment, a system includes a processor configured to determine that an application-limiting state exists in a vehicle. In this example, the processor is also configured to restrict an accessible number of application icon display pages on a vehicle display. The processor is further configured to re-order application icons from an original ordering, such that applications designated as priority applications remain accessible on the restricted number of application icon display pages and revert ordering of the application icons to the original ordering when the application-limiting state ceases.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
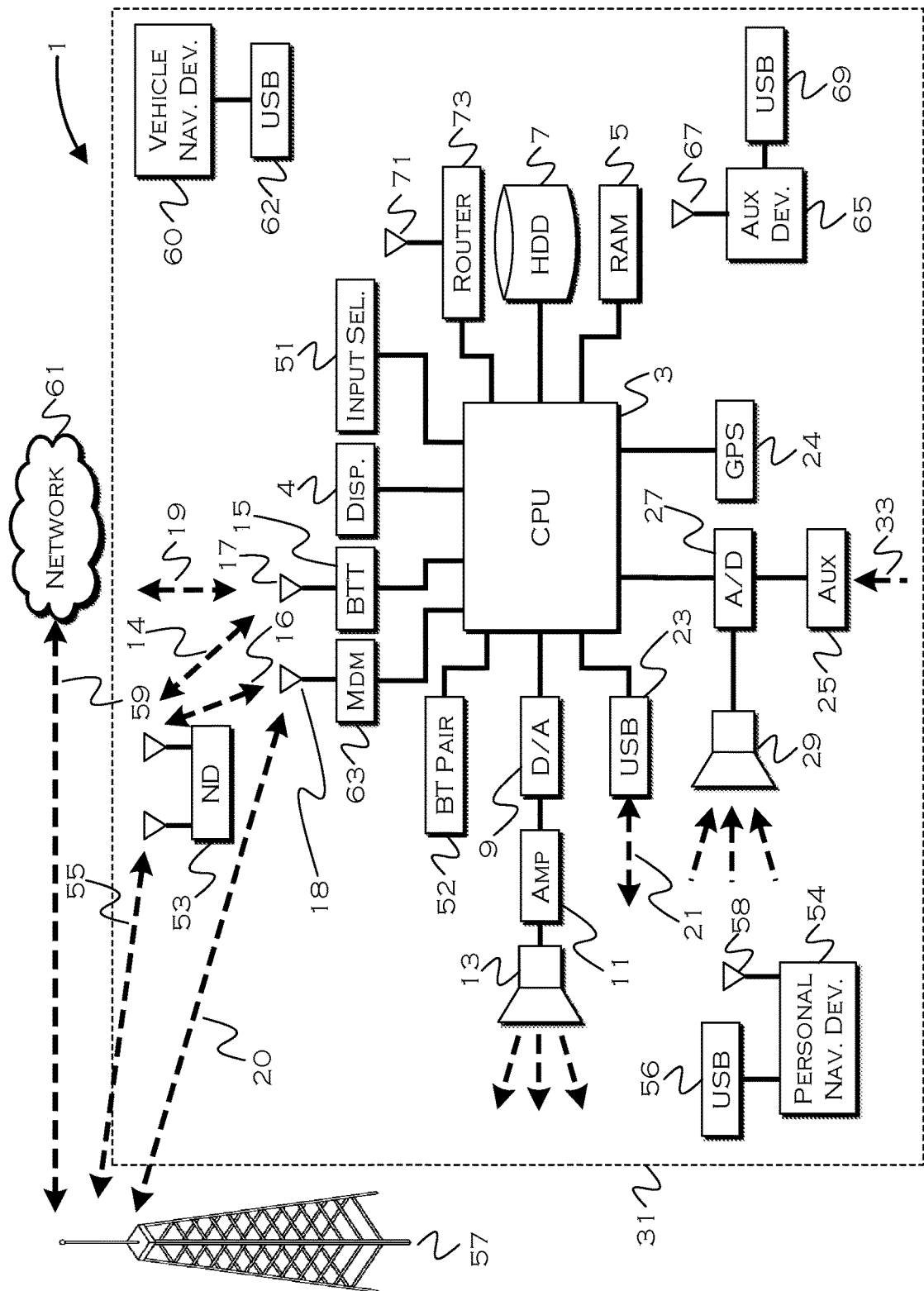
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While the driving experience is often improved and enhanced by the use of vehicle-based applications, it can be difficult for a driver to navigate through pages of applications to find an application-of-interest while the driver is driving. In a manner similar to how certain input features are locked when driving, automotive OEMs may address this situation by locking the number of viewable pages while a vehicle is under speed.

If an original application ordering were preserved, this could result in drivers not being able to access new applications, which would typically get added to a last-page of a series. While the driver might be able to manually re-order lists of applications, it is uncommon for drivers to spend a large degree of time interacting with vehicle displays while simply sitting around. That is, while it may be convenient to re-order applications on a smart-phone, people may find it much less convenient to do so on a vehicle display. In other examples, applications may be organized alphabetically, but this may place certain applications at the end of a list based on the application name, even if the application is a highly desired application.

The illustrative embodiments provide an option to associate user-priorities with certain applications. When a vehicle restricts display of applications to a limited number of pages (e.g., 1 or 2), the system can re-order the application icons to reflect the user preferences, putting the preferred applications on the several available pages. The re-ordered applications could have fixed locations, or could be organized alphabetically or by a ranking order. In one example, once an application has a "spot" on a preferred page, it retains that spot until the application is removed from the preferred list (e.g., replaced by a new application). The new application would then receive the old spot, and this keeps the applications in a regular order so that a driving user knows where to expect a particular application to be located. When a vehicle slows, the process may revert the accessible list of applications to the previously ordered pages. In other examples, the ordering may be automatic whenever a new application is designated for priority, and this re-ordering may persist until another new application is designated for priority, at which time another re-ordering may occur.

Because of the automatic re-ordering when the vehicle limits access, people can simply add desirable applications and designate those applications as preferred applications. This avoids having to manually re-order applications, and instead allows the vehicle to present the relevant applications when application access is limited. This should increase the frequency with which drivers are able to use newly added and desirable applications, without requiring the driver to manually re-order the application displays when a new application is added. This also allows less technically savvy people, who otherwise might not be able to manually re-order displayed applications, to enjoy the benefit of newly added applications while driving.

Figure 2:
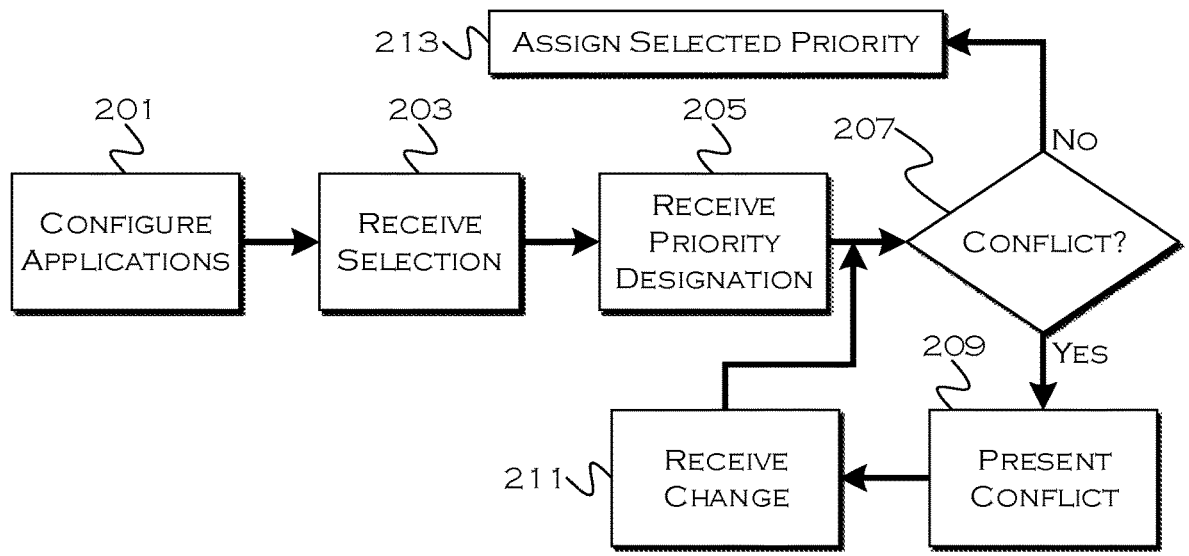
FIG. 2 shows an illustrative process for priority configuration.

FIG. 2 shows an illustrative process for priority configuration. In this example, the process receives 201 a command to begin configuration of application priorities. This process could be run individually with respect to a particular application, or could be run to initially prioritize a batch of applications. In other examples, a new application may have a priority designator (such as a selectable star) and the conflicts portion of this process could be engaged if the priority designator were selected.

There are several possible ways to provide priority of applications. In a binary system, a vehicle may display 1-2 pages of applications when the vehicle is moving, and any number of pages when the vehicle is at rest. In this sort of system, the vehicle would move the prioritized applications to the displayed pages while the vehicle is moving, and revert (if desired) to the original ordering when the vehicle was at rest. Reversion to an original state is an optional aspect of the concept, and re-ordering could certainly persist once the system had reordered the applications.

In another possible methodology, the vehicle may limit the number of displayed pages based on a level of driver distraction. For example, if the level of distraction was low, the vehicle may allow access to 3 pages of applications, and as the level of distraction rises, the number of pages and/or number of applications per page may lower. In this example, applications may have an ordered priority associated therewith, and may be presented in order of the priority based on how many applications and/or pages were accessible. The methodologies and techniques herein lend themselves to both and similar types of systems, and are not restricted to any particular version of how application display is prioritized or limited.

In the process shown in FIG. 2, the system receives 203 selection of an application to be prioritized. In batch processing, this could be a selection of multiple "priority" applications, or a re-ordering of application rankings in an ordered priority list. In one-off processing, this could be selection of a priority icon associated with an application.

Whether the priority is "binary" or ordered, the process receives 205 a designation of priority based on user preference. Since there is a limited space for priority applications, the process may identify 207 any possible conflicts based on the indicated priority. For example, in the binary system, there may be a total of sixteen spaces (eight per page) for application display. If seventeen applications are selected as "priority," then the process may realize that this is more applications than could be displayed on the two accessible pages.

In the ranked process, the system may realize that two applications have been given the same priority ranking. This may be ok if a high-medium-low schema is used (up to a maximum for each tier), but similar conflicts could be identified as described above. Essentially, a conflict exists when user designations would cause more than an allowable number of prioritized applications to be attempted to be displayed (resulting in non-display of at least one priority application).

The process presents 209 any identified conflicts for user resolution, and receives 211 a user-designated change. Presentation of a particular conflict can inform the user which applications may not be displayed, and/or can allow a user to de-prioritize or change priority of at least one application to resolve the conflict. This can also include instructions as to what needs to be done in order to resolve the conflict, so as to avoid user confusion. Once any conflicts have been resolved, the process assigns 213 the designated priority.

Figure 3:
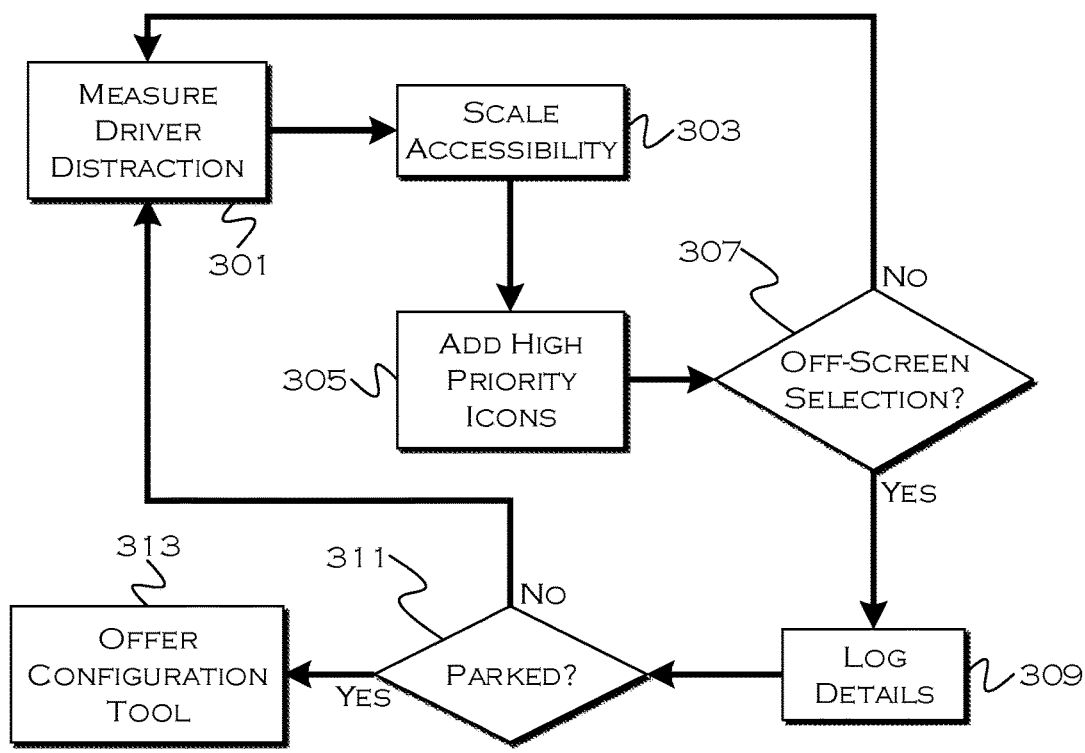
FIG. 3 shows an illustrative process for access provision.

FIG. 3 shows an illustrative process for access provision. As previously noted, in the binary type system a fixed number of pages (e.g., two pages) may be displayed when a vehicle is in motion. In this example, however, the process may dynamically adjust both the number of pages and number of applications per page, based on driver distraction levels. For example, in the lowest level of distraction, while a vehicle is moving, the driver may be able to access two pages and eight applications per page. A higher level of distraction (heavy traffic, rain, etc.) could result in, for example, a single page or four icons per page. A higher level of distraction than that (e.g., heavy traffic and rain) could result in a single page with only four applications. In such instances, some form of ordering would be needed to organize which priority applications were displayed. This ordering could be based on user-designated denotations or could be based on, for example, observed usage (with more-frequently-utilized applications being given higher priority within the priority applications).

In this example, the process measures 301 a driver distraction level based on a variety of factors known in the art. This can include, for example, the mere fact a vehicle is moving, a measured or determined localized traffic level (locally determinable or obtained from a server), a measured or determined severity or type of localized weather (e.g., light rain, heavy rain, snow, etc.) or any other reasonable constraints. Even a number of passengers and/or conversation level inside a vehicle can be a basis as a gauge of driver distraction.

Based on a tiered level of distraction (e.g., low, medium, high) the process then scales 303 an accessibility factor for available applications. As previously noted, this could be, for example, limiting accessible pages, decreasing a number of applications per page (which could also result in increasing application icon size for easy access), etc. Based on a current accessibility setting (e.g., two pages, four icons per page), the process then adds 305 the appropriate number of priority application icons. This tailoring can be an ongoing process based on a driver distraction level (e.g., at a later point in the drive, more or fewer pages and icons could be available).

Since the user may want an application that is not currently displayed on the set of available pages, the process may detect 307 if a user tries to scroll past the currently available set. While the process would prevent access to other icons, such an action would indicate that an unavailable application was desired under the current situation. This may be an opportunity to improve priority ranking, and thus the process could log 309 the attempt to scroll past the icons, along with any relevant accessibility parameters (e.g., which applications were accessible, what the level of distraction and maximum number of applications were, etc).

Once the vehicle is parked 311, the process could offer a configuration tool that would allow the user to re-prioritize the applications in order to better reflect an actual user preference.

Also, as previously noted, original application ordering can be preserved, and the process can revert to the original priority when the accessibility state changes. And, as previously noted, various applications can consistently be placed in the same spot in varied priority states, which avoids having the user to have to hunt for a desired application when priority levels change. Applications of new priority designation can simply be placed in a spot where the previous application, that is now de-prioritized, existed.

Figure 4:
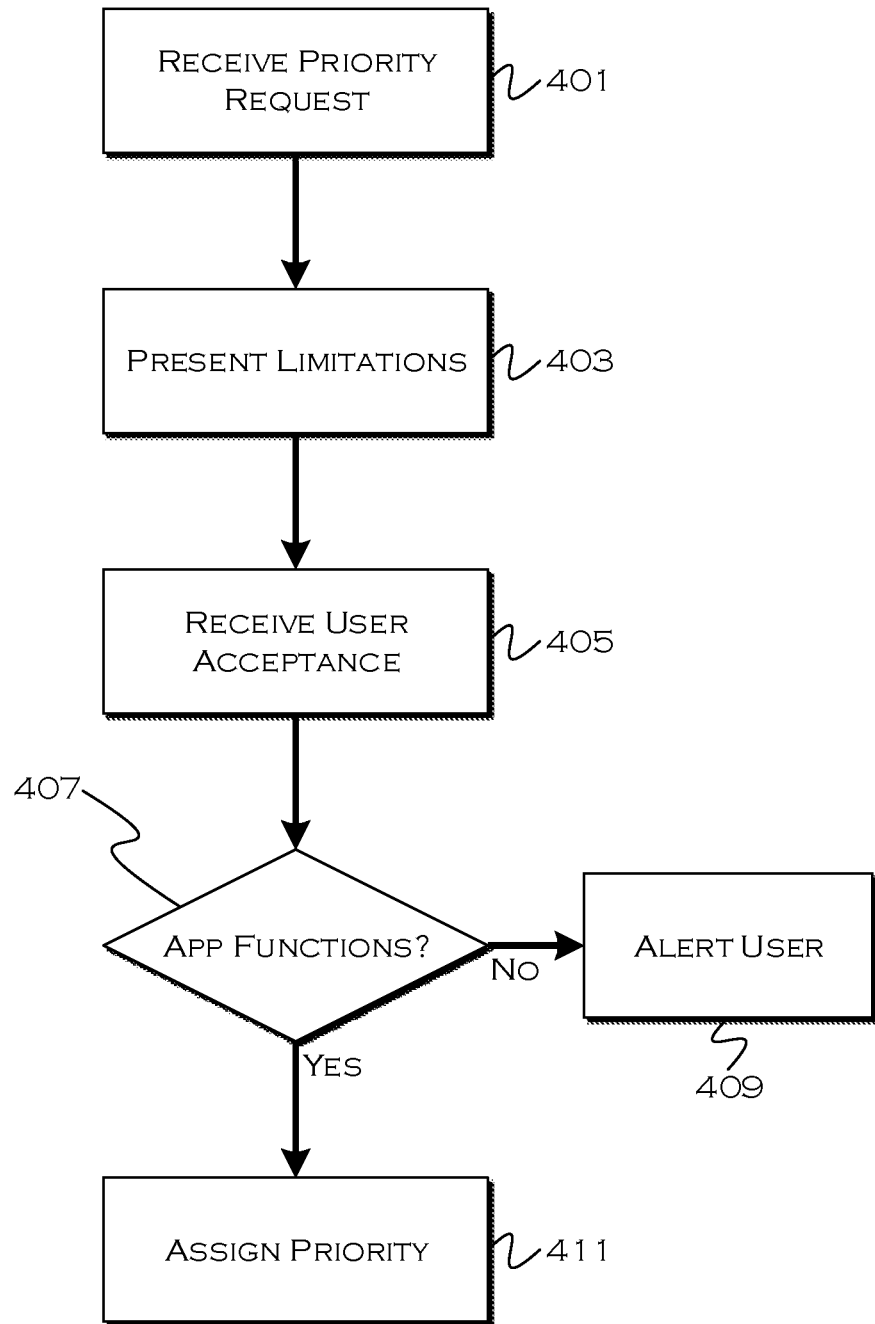
FIG. 4 shows an illustrative process for application priority tailoring.

FIG. 4 shows an illustrative process for application priority tailoring. In this example, certain applications may have limited functionality when a vehicle is under speed. That is, even if the application is accessible, inputs, outputs, etc. may be limited based on levels of driver distraction, safety concerns or government regulations. Accordingly, the prioritization process alerts a user to these constraints when priority is selected, so that the user, who has limited available priority choices, can determine if the application so-limited is still a desirable priority application.

In this example, the process receives 401 a priority request to assign some form of priority to a particular application. Also, in this example, the chosen application has some limitations applied based on speed or driver distraction, which could be, for the sake of example only, limiting input to 20 characters per minute. The process presents 403 any associated limitations that would attach to the application, and the user confirms 405 that the limitations are acceptable.

Also, in this example, certain application aspects or functions may be completely disabled based on certain speed or distraction parameters. If the applications has such functions (e.g., video display may be disabled) 407, the process could warn 409 the user that the application may lose significant functionality. Since both developers and OEMs may know which functions are disabled during use, the developer could designate a list of "critical" functions in the code, and the OEM process could scan the "critical" functions to determine if any core functionality would be lost based on restrictions. This would prevent the user from prioritizing an unusable application (unusable under speed) and annoying the user when the application failed to function when selected while driving. If no core functionality will be lost, the process can assign 411 the prioritization.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A computer-implemented method comprising:
restricting an accessible number of applications while an application-limiting state exists in a vehicle, the restricting including re-ordering displayed application icons, responsive to engagement of the restricting, such that applications having a user-designated ordered priority associated therewith are still accessible on a vehicle display being limited by, the restricting, wherein the application-limiting state includes tiers of limitation, and the user-designated priority is usable to determine which applications are still accessible in increasingly restrictive tiers of restriction, by selecting applications for display based on the ordered priority, such that higher priority applications persist as the display is limited.

2. The method of claim 1, wherein the display is limited to a fixed number of pages of applications, less than a maximum number of pages of applications, by the restricting.

3. The method of claim 1, further comprising reverting to a pre-restricting ordering and display of application icons once the application-limiting state ceases.

4. The method of claim 1, wherein more restrictive tiers of limitation include fewer application icons per page than less restrictive tiers.

5. The method of claim 1, wherein more restrictive tiers of limitation include fewer total available pages of application icons than less restrictive tiers.

6. The method of claim 1, wherein the user-designated priority includes a fixed number of applications designated for each tier of limitation.

7. The method of claim 1, wherein the application-limiting state includes vehicle moving at over a threshold speed.

8. The method of claim 1, wherein the application-limiting state includes a determined level of localized traffic.

9. The method of claim 1, wherein the application-limiting state includes a determined severity of localized weather.

10. The method of claim 1, Wherein the application-limiting state includes a determined type of localized weather.

11. A system comprising:
a processor configured to:
receive a user-input first priority designation for a first application accessible through a vehicle display, the first priority designation falling within an ordered priority designation for a plurality of applications and expressly designating the application as being of a higher or lower priority than a second application based on the ordered priority designation associated with both the first and second applications;
determine when an application-limiting state exists within a vehicle;
re-order application icons, responsive to imposition of the application-limiting state, such that the first application having the first priority designation is still accessible on a restricted display of application icons; and
present the restricted display on the vehicle display, including the first application having the first priority designation, wherein the application-limiting state includes tiers of limitation, and the ordered priority is usable to determine which applications are still accessible in increasingly restrictive tiers of restriction, such that applications with higher ordered priority persist while other applications with lower ordered priority are no longer displayed.

12. The system of claim 11, wherein the processor is configured to consistently re-order the application icons each time the application limiting-state exists, such that the first application having the first priority designation appears in the same location on the restricted display each time.

13. The system of claim 11, wherein the processor is configured to revert to an original ordering of application icons, that existed prior to the re-ordering, once the application-limiting state ceases; and
present a display of the reverted original ordering.

14. The system of claim 11, wherein the processor is configured to present the restricted display as a plurality of accessible application pages, less than a maximum number of accessible application pages that exists when the application-limiting state does not exist.

15. The system of claim 14, wherein the processor is configured to present the restricted display as a maximum number of icons per page, less than a maximum number of icons per page that exists when the application-limiting state does not exist.

16. The system of claim 11, wherein the processor is configured to:
determine that a maximum number of applications having the first priority designation has been exceeded;
present a list of applications having the first priority designation for de-prioritization of at least one application;
receive de-prioritization instructions; and
remove the first priority designation from an application in the list in accordance with the de-prioritization instructions.

* * * * *